Dec. 25, 1956 E. K. NELSON 2,775,659

CASCODE CIRCUITS

Filed Feb. 20, 1951 2 Sheets-Sheet 1

INVENTOR.
Edwin Keith Nelson

BY

Ostrolenk & Faber

ATTORNEYS.

Dec. 25, 1956 E. K. NELSON 2,775,659

CASCODE CIRCUITS

Filed Feb. 20, 1951 2 Sheets-Sheet 2

INVENTOR.
Edwin Keith Nelson

BY
Ostrolenk & Faber
ATTORNEYS 2,775,659
Patented Dec. 25, 1956

2,775,659

CASCODE CIRCUITS

Edwin Keith Nelson, Pico, Calif., assignor to Standard Coil Products Co. Inc., Los Angeles, Calif., a corporation of Illinois Application February 20, 1951, Serial No. 211,959

12 Claims. (Cl. 179—171)

My invention relates to television cascode circuitry and more particularly to a triode grounded cathode input coupled to a grounded grid output cascode circuit particularly suitable for television receivers.

The television band width, approximately 172 megacycles wide, from a low end of 54 megacycles to a high end of 216 megacycles, requires an amplifier having a relatively flat frequency response.

Such amplifiers must have the lowest possible noise figure and thus generally triodes are preferred to pentodes (see a comprehensive discussion of noise in amplifiers in chapter 13 of Valley and Wallman, Vacuum Tube Amplifiers of the Radiation Laboratory Series—McGraw-Hill—1948).

A triode can be employed in three ways, namely, as a grounded cathode stage, a grounded grid stage, or a grounded-plate stage referred to as a cathode follower. For a given tube type these three configurations have been shown to yield, very closely, the same noise factor. Furthermore as shown in the above mentioned reference of the nine possible ways that two triodes can be cascaded, the grounded cathode input and grounded grid output is the best combination with regards to noise figure, stability and gain.

This grounded cathode, grounded-grid combination is hereinafter designated as cascade circuitry.

The usual condition sought for in practice to ensure the stability of an amplifier is to have the product of the feedback fraction and the voltage gain be of a magnitude less than unity when the phase angle is zero. This condition, where no oscillations are possible, is present in cascode circuits since the cathode of the grounded-grid triode offers a low impedance to the output of the first tube. This low impedance output results in a very low voltage gain in the grounded cathode stage keeping the above referred to product to a magnitude around unity. Actually the voltage gain across the cascode circuit closely approximates the ratio of the transconductances of the two tubes, which is unity when the two tubes are similar. The problem, then, of feedback or stability, common with triode tubes at high frequencies is not an important consideration in cascode circuitry.

Though it is evident from the above discussion that neutralization in cascode circuits is not necessary for stability purposes, neutralization for another purpose, namely, noise reduction was necessary. The prior art utilized in every case neutralization of the first triode and in many cases neutralization of the second triode as well. Neutralization requires additional components in the circuit and necessitates additional considerations in the analysis of the network.

In cascode circuits, the two triodes were coupled by means of a tuned circuit which limited the frequency response to a relatively small band width as compared to a television band width.

In the prior art a suitable frequency response was acquired either by means of tunable circuits or by various frequency compensation means. Tunable circuits require a manually operated tuner comprising moving parts and sliding contacts producing deleterious effects at high frequencies. High frequency compensation employing the usual shunt inductance or "peaking coil" does not serve where the maximum frequency limit is over 10 megacycles, and series peaking compensation, shunt peaking compensation, or any combination thereof cannot practically produce a frequency response as high as the required 216 megacycles. The latter compensation methods would necessitate an extremely complicated network of many cascaded compensating components to raise the high frequency response to the vicinity of the upper limit.

My invention overcomes these difficulties by providing a cascode circuit in which the coupling between the two triodes is tuned automatically over the band width without utilizing any moving part and in general contemplates the use of a combination of series and parallel resonant circuits in such a manner as to automatically tune the circuit to the incoming signal and obviate the necessity for any neutralization.

It is then one of the primary objects of the present invention to provide a novel circuit which will obviate the necessity for neutralization of either of the stages of a two stage cascode circuit applicable for television.

Another object of the present invention is to provide a novel cascode circuit with a low noise factor.

A further object of the present invention is the provision of novel coupling circuit broadbanding the two television bands.

A still further object of the present invention is the provision of a cascode circuit having a minimum of oscillator radiation.

A still further object of the present invention is the provision of a cascode circuit with a novel broadband coupling circuit which has no moving parts.

A still further object of the present invention is the provision of a novel automatically tuned circuit.

A still further object of the present invention is the provision of a novel cascode circuit having a minimum of oscillator radiation.

A still further object of the present invention is the provision of a novel circuit having a substantial power gain.

A still further object of the present invention is the provision of a novel cascode circuit of high stability.

Still another object of the present invention is to provide a novel cascode circuit having effectively a direct coupling between the two stages of predetermined frequencies.

A still further object of my present invention is the provision of a novel circuit having a much improved power gain on the high frequency channels.

Still a further object of the present invention is to provide a novel broad band amplifier whose gain is appreciably reduced outside the ranges of the television bands and between said bands.

The features of the invention together with the objects and advantages thereof will best be understood by reference to the following description taken in connection with the accompanying drawing in which.

Figure 1:
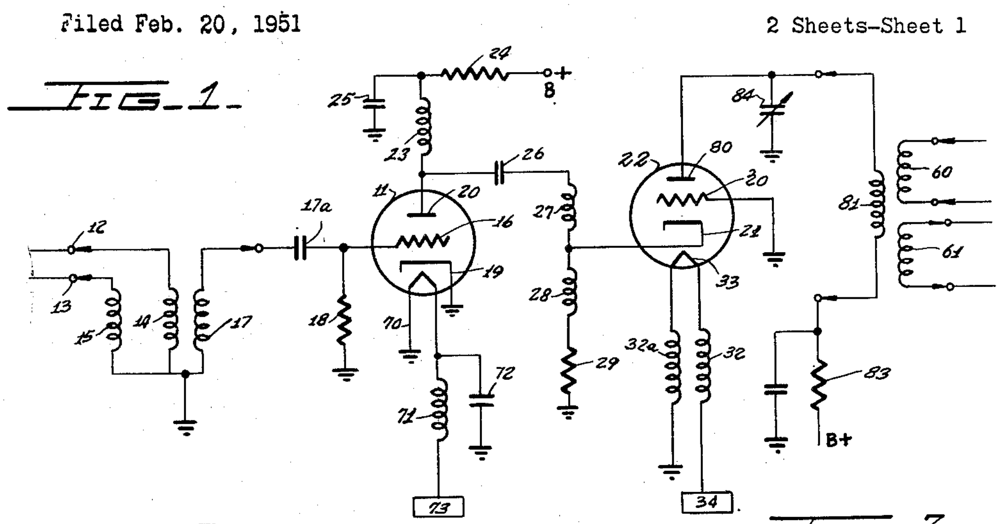
Figure 1 shows the cascode circuitry of the present invention.

Referring to Figure 1, the input circuit to the first triode tube 11 starts with the customary 300 ohm input from the antenna (not shown) to input 12 and 13 in the circuit diagram. The signal is fed into a balanced primary coil or antenna matching coils 14 and 15 which is a reversed bifilar helical coil. A reversed bifilar coil is a coil which has perfect right and left-hand helical coils wound on a common mandrel. Although other coils may work equally well as far as noise reduction, the bifilar helical coil gives a minimum capacity coupling between the antenna tuner lead connections 12 and 13 and the grid 16 of tube 11 which blocks out any oscillator voltage.

The input coil secondary 17 has one end at ground and the other end capacitively coupled through condenser 17A to grid 16 of tube 11. The grid 16 must be supplied with a negative bias as through the resistor 18 connected from grid 16 to ground in order to operate the tube on the linear portion of the triode characteristics. The value of this resistor does not seem to be critical according to my investigations and may be anything from 10,000 to 50,000 ohms. The cathode 19 of tube 11 is connected directly to ground, and the filament 70 is connected through an inductance 71 to the filament supply 73. The filament supply is by-passed to ground by means of condenser 72.

The most critical part of the cascode circuitry is in the coupling from the plate 20 of the first triode 11 to the cathode 21 of the second triode 22.

Consider the coupling network as it applies to the low television channels from 54 to 88 megacycles.

Coil 23, the plate coil or plate choke, connected to plate 20, is fed through an isolating resistor 24 of 2000 ohms from the B+ tuner. The coil 23 has a by-pass condenser 25 approximately 120 micromicrofarads.

The plate 20 is coupled by means of coupling condenser 26, the capacitance of which is between 100 and 120 micromicrofarads to a coil 27. Coil 27 has a small impedance at low frequencies, being a very small coil of about 6 or 7 turns. On the low channels, coil 27 acts as a long condenser lead for the condenser 26. Another coil 28 is connected to coil 27 and to cathode 21 of tube 22. Coil 28, the cathode return circuit of the second triode, has its other end connected to ground through a 100 ohm biasing resistor 29.

Coils 23 and 28 in parallel together with the distributed capacities of the circuit provide a parallel resonant circuit in the low V. H. F. band, that is, more specifically in this embodiment in the bandwidth of channel 2.

Figure 2:
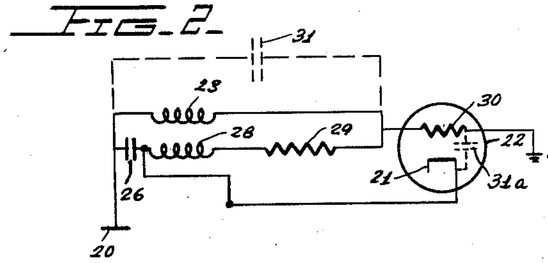
Figure 2 shows the equivalent coupling circuit of the invention on low frequency channels.

Figure 2 shows the equivalent parallel circuit which is effective at low frequencies. Plate 20 is coupled to cathode 21 of tube 22 by means of coupling condenser 26. Coil 23 in parallel with the series circuit formed by capacitance 26, coil 28 and resistor 29, and shunted by the distributed capacity 31 (shown in dash lines since no physical capacity is actually used) of the circuit forms a parallel resonant circuit which presents a high impedance to signals in the low television band. The coil 27, in Figure 1, has relatively small impedance at low frequencies as discussed above and accordingly does not appear in the circuit of Figure 2.

Figures 4, 5, 6, 7, 8:
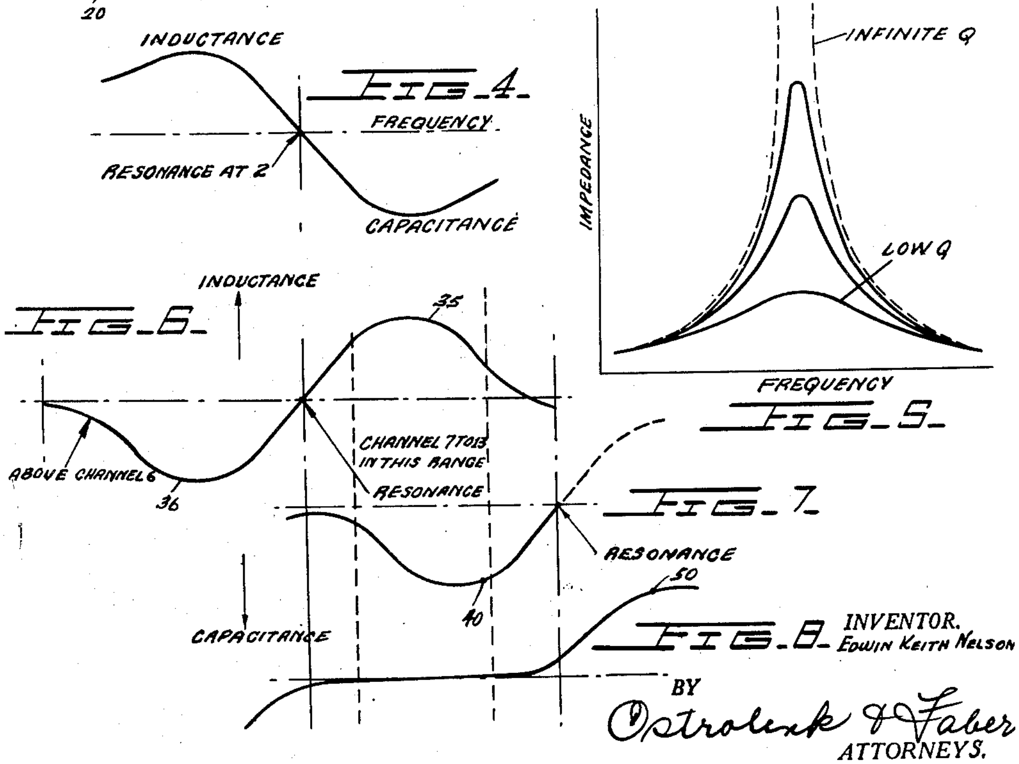
Figure 4 shows the universal reactance curve of parallel impedance.
Figure 5 shows the variation of the impedance of a parallel circuit as frequency changes for various Q's.
Figure 6 shows the resonant curve of a component of the circuit.
Figure 7 shows the resonant curve of another component of the circuit.
Figure 8 shows a composite resonant curve of Figures 6 and 7.

It has been found advisable to make coil 28 smaller than coil 23. This reduces the Q of the circuit as resistor 29 is in series with coil 28. The reduction of the Q broadbands the impedance of the circuit over the whole of the low channels as shown in Figure 5 since the lower the Q of the circuit, the broader the effective band width.

Coils 23 and 28 in parallel should resonate within the band width of channel 2. These coils resonating at higher frequency would set up conditions for oscillation and instability in the grounded cathode triode 11 and resonating at a lower frequency would allow the resonance curve to taper off that much more rapidly towards channel 6 defeating the purpose of the broadbanding. The combined resonance then as shown in Figure 4 of coils 23 and 28 in parallel plus the stray and distributed capacities should be in the neighborhood of the center frequency of channel 2.

The cathode 21 of tube 22 or any grounded grid tube has loading impedance of only a few hundred ohms. It is desirable that the resonant impedance of coils 23 and 28 should be several times this cathode loading impedance in order that the cathode and the plate circuit of the grounded grid stage may be the determining load rather than the inductive circuit.

This action is readily seen when observed in conjunction with Figure 2 where the parallel circuit of 23 and 28 has a substantially higher impedance than the plate 20 and cathode 21 circuit. It is then the plate and cathode of the grounded grid circuit which substantially determines the loading.

This loading makes the resonance and exact frequencies of the components of the parallel circuit less critical.

On the high frequency channels 7–13, coil 23 and coil 28 assume very high impedances and act as radio frequency blocking coils and coils 28 and 23 now present substantial impedance. Coils 23 and 28 may show a very small distributed capacity but if they are reasonably carefully wound, this would be negligible. Most tubes, however, on the high channels have a cathode heater capacity of approximately 3 micromicrofarads representing a capacitive load on the input which must be taken into account.

It is possible to take advantage of the resonant effect of the second cathode heater capacity and filament inductive circuit hereinafter described and get a very high degree of build-up at the high channels where it is required.

Figure 3:
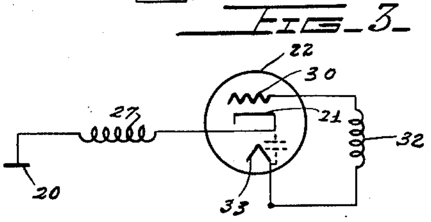
Figure 3 shows the equivalent coupling circuit of the invention on high frequency channels.

A coil 32 in Figures 1 and 3 is connected to the filament 33 of tube 22 and to the filament supply voltage source 34 shown only in Figure 1 which may be 6.3 volts. The other end of the filament 33 is connected to ground through an inductance 32A. It is found upon changing the frequency on coil 32 that the circuit as shown in the equivalent circuit of Figure 3 exhibits all the characteristics which might be expected of a series resonant circuit. Figure 6 shows a series reactance curve where the circuit looks inductive at frequencies above resonance, as at 35, and capacitive at frequencies below resonance, as at 36.

The circuit is then set up so as to have the coil 32 in such resonance as to have its inductive portion fall within the high television channels. Bringing the resonance of coil 32 into the lower end of the high frequency channel 7, or 174 megacycles, causes the reflected plate circuit to the cathode 21 to become of lower impedance than the impedance reflected by the coil 32. The plate circuit then takes over as the load as originally desired.

The inductive resonance curve, however, of the filament coil 32 alone is rather narrow and would not cover the high channels. In order to completely broadband the channels, another element becomes necessary. This element added is coil 27 hereinabove described.

Coil 27 is made to resonate at a frequency in the neighborhood of channel 13 or 216 megacycles. The coil 27 now looks capacitive over the high channels as at 40, Figure 7, when coil 32 looks inductive as shown in Figure 6 at point 35.

We have, therefore, a combination of a tuned circuit increasing in capacity with reduced frequency and another circuit containing coil 32 increasing in inductance effecting an automatically tuned circuit as illustrated in Figure 8 over a broadband width. Figure 8 shows the superimposed reactance curve of coils 33 and 27.

This effect need not be so critical as to have absolute resonance at every point. The sole object is to have the resonant impedance as presented by the combination of the tuning of these coils appreciably higher in impedance to the signal frequency than the reflected plate load on the cathode 21 of the grounded grid triode 22.

From below 174 up to 216 megacycles, coil 32 looks inductive. Coil 27 on the other hand becomes capacitive. Proper adjustment of the coils creates a circuit which is resonant across the high channels. If this resonant impedance can be made several times as large as cathode input impedance, the gain across the high channels will be nearly uniform and depend mainly on the input and output circuits. A value of 3 micromicrofarads or less for the cathode heater capacitance meets this condition.

Above 21.6 megacycles, as at 50, Figure 8, coil 27 becomes inductive while inductance of 32 drops rapidly and the circuit is again non-responsive.

In general, the cascode coupling response may be broken in five distinct bands:

A. Below 54 megacycles—below channel 2.
B. 54–88 megacycles—the low television band.
C. 88–174 megacycles—in between that television band.
D. 174—216 megacycles—the high television band.
E. Above 216 megacycles—above channel 13.

The ideal response would be a maximum on B and D and a minimum on A, C, and E. This coupling system of the present invention approaches this ideal.

Coils 23 and 28 in parallel including coil 27 and circuit capacities resonate around 54 megacycles. Resonance is best held near 54 megacycles as a design center as the circuit becomes regenerative on the capacitive slope 42 (Figure 4) of the parallel resonance curve. Coil 32 is of negligible impedance in the low band; thus, only the cathode grid capacitance of tube 22 shows as capacity loading, helping to level the impedance and gains on the two bands.

The above referred conditions C, D, E are all interlocked and are complex functions of coils 27 and 32, the cathode heater capacitance and $Y_4$. Coils 27 and 32 are purely radio frequency blocking coils having a small distributed capacity. Coil 32 is series resonant with the cathode heater capacitance at some frequency below 174 megacycles. Coil 27 resonates at 216 to 217 megacycles.

The wide coupling band width and the fact that the plate 80 of tube 22 sees a low resistive load over most of the channel passband contribute to the low noise levels obtained without neutralization of the first triode tube 11. It is evident that little could be gained by neutralization as the circuit is substantially stable.

The two tubes 11 and 22 have then certain tube requirements. The grounded cathode section tube or tube 11 should have:

1. High gain.
2. Power capability at higher frequencies.
3. Input admittance as low as possible.
4. Grid, plate and cathode lead inductances not critical.
5. Grid to plate capacitance is not critical but should be low for radiation reasons.

The 6N4 tube seems to most closely fit the requirements. The grounded grid section tube or tube 103 should have:

1. Low plate to cathode capacitance.
2. Low cathode to heater capacitance.
3. High approximately 50–60.
4. Medium to high transconductance.
5. Lead inductance not critical except for the grid lead inductance.
6. Tube plate resistance may be as low as 10,000 ohms.

The 6AB4 tube seems to most closely fit the requirements. Tube 103 is then a 6AB4 tube.

The plate circuit of tube 22 consisting of plate 80 is connected into the usual subsequent stages of a television receiver circuit employing an unequal double tuned circuit by means of primary 81. This according to the best of theory gives a coil gain which is greater than the gain of a conventional double tuned circuit. Two double tuned circuits 60 and 61 and accompanying components are contained in the figure to complete the circuitry and do not in themselves constitute invention.

The plate 80 is connected to B+ through loading resistor 83. The B+ is by-passed to ground by capacitor 84, and the primary 81 is tuned by variable condenser 84.

Figure 9:
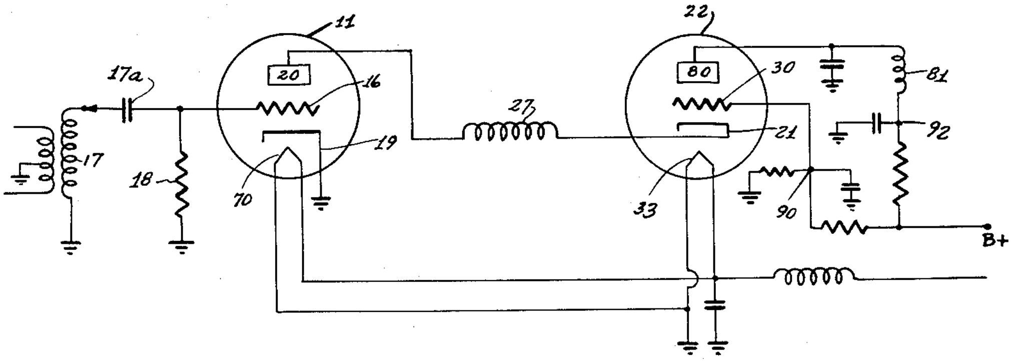
Figure 9 shows a modified form of my circuit.

The circuitry of my invention may be simplified and still retain satisfactory operation. As illustrated in the circuit of Figure 9, the grounded cathode stage is directly coupled to the grounded grid stage through coil 27. The cascode circuit can then also be used in the direct coupled form.

The second or grounded grid section now has a direct current connection between the cathode 21 and the plate 20 of the first or grounded cathode section. The grid 30 is connected to a voltage divider 90 and is by-passed through capacitor 91 to ground. The voltage divider 90 is used to control the division of voltage between the two tubes 11 and 22. The plate 80 of the grounded grid section is connected through the same coil 81 described above in reference to Figure 1 but the high voltage end 92 of the coil 81 must now be connected to a supply voltage B+ of approximately twice the voltage used in the circuitry of Figure 1. This voltage should be between 250 and 300 volts.

With this circuitry the coils 23 and 28 connecting the plate 20 of the grounded cathode section to the B+ supply and the coil 28 connecting the cathode 21 of the grounded grid section to ground, as shown in Figure 1, are not necessary as the direct connection accomplishes the same purpose, as is hereinafter described. The coupling condenser 26 in Figure 1 can also be eliminated.

On the low channels the plate 20 of the grounded cathode tube now sees only the cathode 21 of the grounded grid section plus the stray capacities of the tubes and circuit. Coil 27 becomes the connection between plate 20 and cathode 21. There is no resonance on the low channel and consequently a much broader response curve is achieved.

Figure 10:
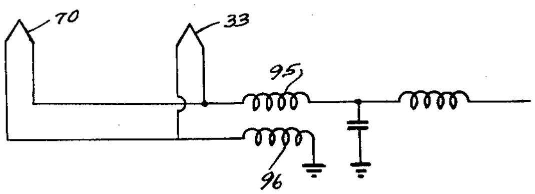
Figure 10 is a circuit diagram of the heater circuit.

On the high channels the exact same condition with regard to frequency response is achieved if a tube such as the 6AB4 or a dual tube with separate heater connections is used. If a dual triode is used, however, such as the 6BQ7 in which the heater of the first and second triode are connected together, a similar, though not exact condition, hereinafter described, results. The filament chokes 95 and 96 as shown in Figure 10 of the second section are now no longer as effective as the filament circuit in Figure 1. The very best that can be done in resonating out the filament cathode capacity is to reduce it to half value due to the interconnected heaters and the fact that the heater cathode capacity of the first tube is connected to ground.

However, even if we have capacity to ground instead of inductance at the cathode of the grounded grid section, the series coil 27 by using a suitable value of inductance can be made to exactly resonate this capacity at one frequency (preferably around 11 or 12 channel) within the high band. This gives a very marked boost to the gain in the high TV bands although the gain has more of a tendency to give a peaked response at the chosen point in the channel. At all frequencies below this point some boost should be observed according to theory. Tests show that this extends even into the low channels. The extra boost from the filament chokes may or may not be used depending on the degree of economy which may be desired. This boost can be made particularly effective on channels 12 and 13 where the gain drops off most severely in normal units.

All of this emphasizes the importance of the series peaking coil 27 in either circuit. By adjusting its resonance it can be made to either tune out cathode to ground capacity in the grounded grid section (thus reducing capacitive loading on the reflected plate loading in the cathode circuit), or it can be made to become a broadly resonant circuit in conjunction with the cathode heater capacity and filament chokes. Requirements of gain and economy dictate what combination is the most usable.

The cathode circuit of tube 22 even if capacitively coupled to ground, as shown in Figure 9, instead of inductively coupled to ground, as in Figure 1, can be made to resonate by means of coil 27 to a frequency within the high band. This resonant frequency is preferably at the frequency of approximately channel 11 or 12 giving an increased gain at the high frequency band of the television band width.

The coil 27 may be used alone to resonate the cathode circuit of tube 22, as in Figure 9, or it may be used in conjunction with the filament coils 95 and 96, in Figure 10, depending upon the degree of economy desired.

The coil 27 alone gives a less uniform and lower gain over the high channels. The coil 27 is much more effective alone than the filament coils alone.

The above discussion with reference to Figures 9 and 10 emphasizes the importance of the series peaking coil 27 in the circuit of Figure 1 as well. Coil 27 can then be made to either tune out the cathode to ground capacity in the grounded grid section thus reducing the capacitive loading on the reflected plate loading in the cathode circuit, or it can be made to become a broadly resonant circuit in conjunction with the cathode heater capacity and filament chokes. Requirements as to gain and economy dictate as to which combination is preferred.

Having now described the invention with reference to a particular circuit, what is claimed and described to be secured by Letters Patent is the following:

1. In a television receiver circuit having an upper and a lower frequency band, a first triode having a grounded cathode and a second triode having a grounded grid and a network automatically tunable to the frequency spectrum in said upper and lower frequency bands, said network consisting effectively of an inductance in said upper frequency band connected between the plate of said first triode and the cathode of said second triode, said inductance having a value designed to parallel resonate with the plate interelectrode capacitance of the first triode at the high frequency portion of said upper frequency band and to series resonate with the cathode interelectrode capacitance of said second triode at the low frequency portion of said band.

2. In a television tuner, an amplifier having an upper and a lower frequency band and comprising a first triode having a grounded cathode and a second triode having a grounded grid, and a network automatically tunable to the frequency spectrum in said upper and lower frequency bands, said network consisting effectively of an inductance in said upper frequency band connected between the plate of said first triode and the cathode of said second triode, said inductance having a value designed to series resonate with the cathode to ground capacitance of said second triode at the low frequency portion of said upper frequency band and to parallel resonate with the plate to ground capacitance of said first triode at the high frequency portion of said band.

3. In a television tuner, an amplifier having an upper and a lower frequency band and comprising a first triode having a grounded cathode and a second triode having a grounded grid, and a network automatically tunable to the frequency spectrum in said upper and lower frequency bands, said network consisting effectively of an inductance in said upper frequency band connected between the plate of said first triode and the cathode of said second triode, said inductance having a value designed to series resonate with the cathode to ground capacitance of said second triode at the low frequency portion of said upper frequency band and to parallel resonate with the plate to ground capacitance of said first triode at a frequency of the order of the highest frequency of said upper frequency band.

4. In a television tuner, an amplifier operable in an upper and a lower frequency band comprising a first triode having a grounded cathode and a second triode having a grounded grid and a network automatically tunable to the frequency spectrum in said upper and lower frequency bands, said network consisting effectively of an inductive reactance in said upper frequency band connected between the plate of said first triode and the cathode of said second triode, said inductive reactance being designed to have one value at the low frequency portion of said upper frequency band so as to series resonate with the cathode to ground capacitance of said second triode and being designed to have a different value at the high frequency portion of said band to parallel resonate with the plate to ground capacitance of said first triode, thereby raising the power gain of said first triode at said high frequency portion of said upper frequency band.

5. In a television tuner, an amplifier having essentially constant gain in an upper and a lower frequency band and comprising a first triode having its cathode effectively grounded at said frequencies and a second triode having its grid effectively grounded at said frequencies, and a network automatically tunable to the frequency spectrum in said upper and lower frequency bands, said network consisting effectively of an inductor in said upper frequency band connected between the plate of said first triode and the cathode of said second triode, said inductor having an inductance designed to parallel resonate with the plate to ground capacitance of said first triode at a frequency of the order of the highest frequency of said upper frequency band and to series resonate with the cathode to ground capacitance of said second triode at the low frequency portion of said upper frequency band.

6. In a television tuner, an amplifier operable with constant gain in the frequency band from 174 megacycles to 216 megacycles and in the frequency band from 54 megacycles to 88 megacycles comprising a first triode having its cathode effectively grounded at these frequencies and a second triode having its grid effectively grounded at these frequencies and a network automatically tunable to the frequency spectrum in said two frequency bands, said network consisting effectively of an inductance in said first frequency band connected between the plate of said first triode and the cathode of said second triode, said inductance having a value designed to series resonate with the cathode to ground capacitance of said second triode at a frequency of the order of 200 megacycles and to parallel resonate with the plate to ground capacitance of said first triode at a frequency of the order of 216 megacycles.

7. A wide-band amplifier system comprising in combination, a driven grounded-grid amplifier with a cathode-input circuit comprising essentially only a capacitance, a driving stage for said amplifier comprising a tube having an anode signal output impedance comprising essentially only an inductor, and a signal transfer circuit coupling said inductor to said capacitance comprising a second inductor series resonant with said capacitance to comprise a low impedance circuit at a frequency within the pass-band of said amplifier, thereby causing a large signal input voltge for the amplifier to be developed across said capacitance.

8. A wide-band high frequency amplifier comprising first and second triodes each having an anode, a cathode and a control grid, means connecting the second triode as a cathode-input grounded-grid stage with its cathode having a predetermined capacitance to ground, means connecting the first triode as a grid-input anode-output grounded-cathode driving stage, a signal coupling circuit including an inductor connected between said triodes, means connecting said inductor in series between the anode of said grounded-cathode triode and the cathode of said grounded-grid triode, said inductor being proportioned to provide inductance that resonates with said predetermined capacitance at a frequency near the high frequency portion of said wide band thereby forming a series resonant low impedance circuit comprising the output load impedance for the first triode.

9. A wide-band high frequency signal amplifier comprising a driver triode having cathode, grid and plate electrodes with its cathode electrode at effective signal ground potential, circuit means impressing the input signals upon the driver grid electrode, a driven triode having cathode, grid and plate electrodes with its grid electrode at effective signal ground potential, the driven triode cathode electrode being the driven triode input and having a predetermined capacitance to signal ground, signal coupling means including an inductor interconnecting said triodes, one terminal of said inductor being effectively connected to the driver plate electrode and the other inductor terminal being effectively connected to the driven triode cathode electrode at amplifier signal frequencies, said inductor thereby forming a series signal circuit with said driver plate electrode, said driven cathode electrode, and its capacitance to signal ground; said inductor being proportioned to provide an inductance that resonates with said driven cathode capacitance at a frequency near the high frequency portion of said wide band thereby enhancing amplification by the amplifier of signals of the higher frequencies of the wide band.

10. A signal amplifier as claimed in claim 9, with said inductor being adapted to have a relatively small impedance at the lower frequencies of said wide-band to provide a negligible effect upon the passage of signals of said lower frequencies from said driver triode anode to said driven triode cathode input.

11. A wide-band high frequency amplifier system for broadcast signals encompassing a first band of frequencies and a second higher frequency band substantially separated from the first band, said amplifier system comprising a driver triode stage having cathode, grid and plate electrodes with the cathode electrode being signal grounded and the input signals being impressed upon the grid electrode, a driven triode stage having cathode, grid and plate electrodes with the driven triode grid electrode at effective signal ground and the driven cathode electrode being the driven stage input electrode with capacitance to signal ground, and an inductor coupling the plate electrode of said driver stage in series to the cathode electrode of said driven stage effectively over said broadcast bands, said inductor having an inductance value such as to resonate with said capacitance at a frequency in said second band to enhance the system amplification of the higher broadcast signal frequencies, and a signal output circuit connected to the plate electrode of the driven triode.

12. A television tuner amplifier system for broadcast V. H. F. signals encompassing a first band of channels 54 to 88 megacycles, and a second higher frequency band of channels 174 to 216 megacycles, said amplifier system comprising a driver triode stage having cathode, grid and plate electrodes, with its cathode electrode at effective signal ground and the input signals being impressed upon the driver grid electrode, a driven amplifier triode stage having cathode, grid and plate electrodes with its grid electrode at effective signal ground and its cathode electrode being the driven stage input electrode, said driven triode cathode electrode having capacitance to signal ground, and an inductor effectively coupling the plate electrode of said driver stage for all channels of both of said bands in series to the cathode of said driven stage, said inductor being proportioned to provide a negligible effect upon the passage of lower frequency channels of said first band from said driver triode anode to said driven triode cathode input and to provide an inductance value that resonates with said driven triode cathode capacitance at a frequency near the higher frequency portion of said second band to increase the system amplification of higher frequency channels of said second band.

References Cited in the file of this patent

UNITED STATES PATENTS

| | | |
|---|---|---|
| 2,289,091 | Bell | July 7, 1942 |
| 2,298,297 | Jacob | Oct. 13, 1942 |
| 2,463,229 | Wheeler | Mar. 1, 1949 |
| 2,489,266 | Cowein | Nov. 29, 1949 |
| 2,524,821 | Montgomery | Oct. 10, 1950 |
| 2,571,045 | Macnee | Oct. 9, 1951 |

OTHER REFERENCES

Text—Vacuum Tube Amplifiers, by Valley and Wallman, Radiation Laboratory Series, McGraw-Hill, 1948, page 657, Fig. 13.12.